United States Patent [19]

Hansen

[11] Patent Number: 4,926,613
[45] Date of Patent: May 22, 1990

[54] PROCESS FOR FILLING AND SUBSEQUENT FUSION WELDING OF RECEPTACLES

[76] Inventor: Bernd Hansen, Heerstrasse 16, 7166 Sulzbach-Laufen 2, Fed. Rep. of Germany

[21] Appl. No.: 403,947

[22] Filed: Sep. 7, 1989

[30] Foreign Application Priority Data

Oct. 7, 1988 [DE] Fed. Rep. of Germany ....... 3834184

[51] Int. Cl.⁵ .................... B65B 47/08; B65B 31/02; B65B 51/14
[52] U.S. Cl. ..................................... 53/433; 53/453; 53/467; 53/477
[58] Field of Search ................ 53/412, 433, 453, 467, 53/469, 477, 479, 481, 511, 559, 561

[56] References Cited

U.S. PATENT DOCUMENTS

| | | | |
|---|---|---|---|
| 2,928,216 | 3/1960 | Orsini | 53/479 X |
| 3,245,197 | 4/1966 | Van Mil, Jr. et al. | 53/453 |
| 3,251,915 | 5/1966 | Pechthold | 53/452 X |
| 3,325,860 | 6/1967 | Hansen | 53/561 |
| 3,381,441 | 5/1968 | Condo, Jr. et al. | 53/452 |
| 3,625,786 | 12/1971 | Pearson et al. | 53/289 X |
| 3,690,803 | 9/1972 | Pechtold et al. | 53/561 X |
| 3,827,214 | 8/1974 | Naumann | 53/561 |
| 3,863,424 | 2/1975 | Naumann | 53/561 |
| 3,897,670 | 8/1975 | Hansen | 53/561 X |
| 4,213,933 | 7/1980 | Cambio | 53/453 X |
| 4,699,748 | 10/1987 | Weiler | 53/453 X |
| 4,790,117 | 12/1988 | Hansen | 53/452 X |

FOREIGN PATENT DOCUMENTS 1800525 5/1970 Fed. Rep. of Germany.
8708939 11/1987 Fed. Rep. of Germany.

*Primary Examiner*—Horace M. Culver
*Attorney, Agent, or Firm*—Roylance, Abrams, Berdo & Goodman

[57] ABSTRACT

In a process for the filling and hermetically sealing by fusion welding a receptacle which is elastically deformable, the liquid level in the receptacle is raised by elastic deformation of the receptacle before the receptacle is sealed closed by fusion welding. A vacuum pressure is established during at least a portion of the length of time between the beginning of the raising of the liquid level and the hermetical sealing by fusion welding applied to the filler connection of the receptacle.

5 Claims, 2 Drawing Sheets

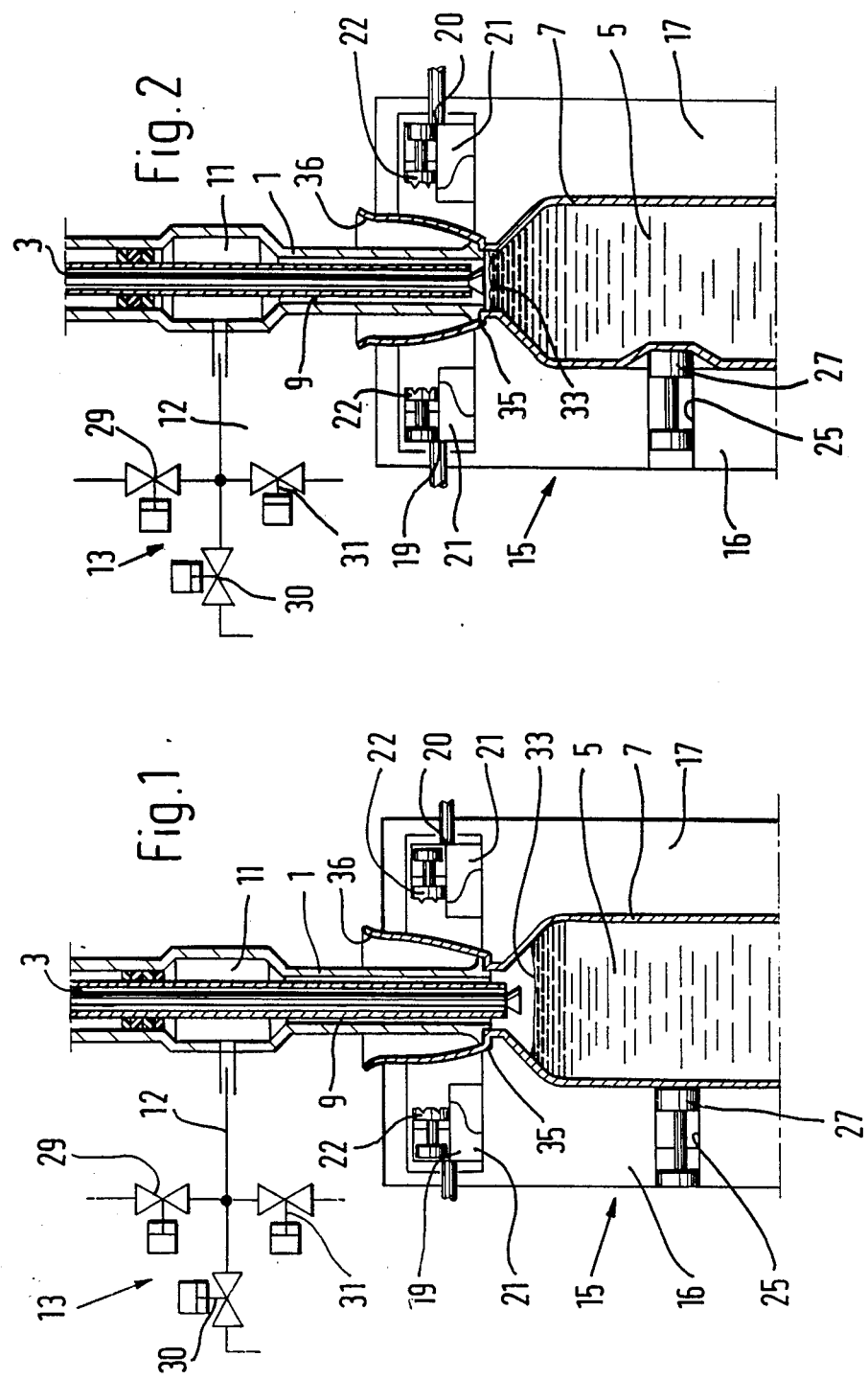

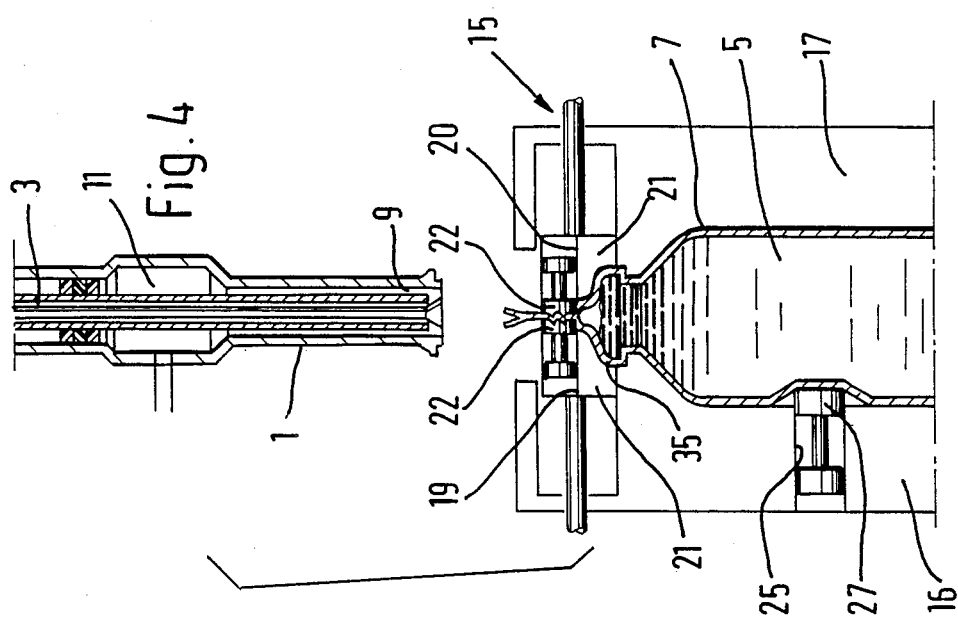
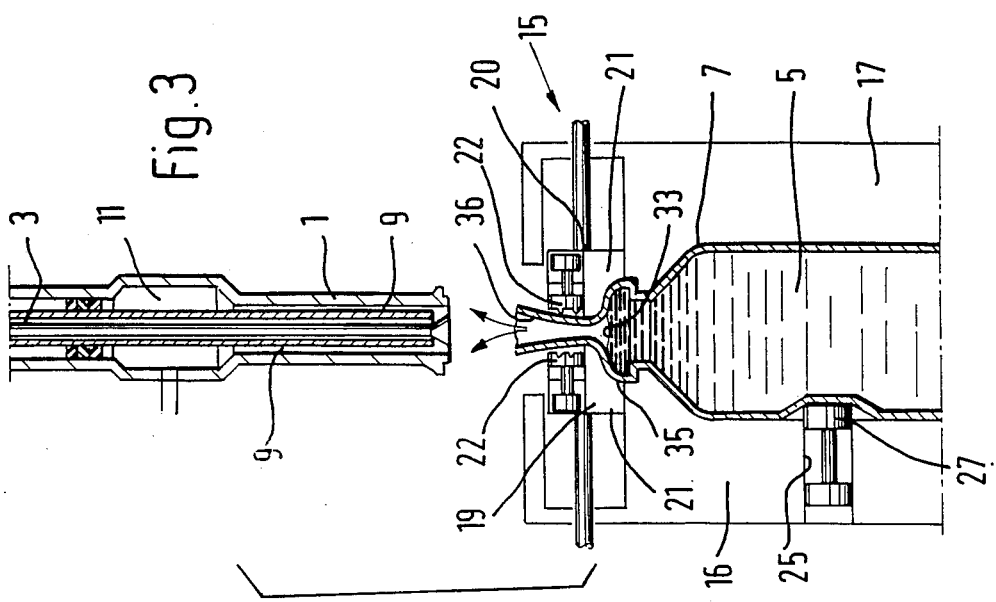

PROCESS FOR FILLING AND SUBSEQUENT FUSION WELDING OF RECEPTACLES

CROSS-REFERENCE TO RELATED APPLICATION

This application is related to U.S. patent application Ser. No. 07/208,491, entitled "Process and Apparatus for Filling and Sealing a Container, and a Container Made Thereby", and filed on June 20, 1988 in the name of Gerhard Hansen.

FIELD OF THE INVENTION

The present invention relates to a process for filling and subsequent sealing a receptacle without pores by fusion welding. The receptacle has at least a portion of its overall surface area which is elastically deformable, and has a filler connection with cross-sectional dimensions smaller than those of the receptacle body. Following the filling, the filler connection is pressed flat at least in its border area and is then welded in a first welding operation, and the liquid level in the receptacle is raised by elastic deformation of the receptacle. The size of the flowthrough opening of the filler connection is diminished in the first welding operation. In a second welding operation, the mouth or opening of the filler connection, which remains open following the first welding operation, is then welded shut.

BACKGROUND OF THE INVENTION

One process for filling and subsequent fusion welding of receptacles is disclosed in German Utility Pat. No. 87 08 939.4. With this process, the totally manufactured receptacle which has been filled and tightly closed and sealed by the fusion welding procedure has only an inconsiderable residual amount of air remaining in the receptacle by virtue of the step of the procedure including raising the liquid level. The volume corresponds in a practical sense to that of the filler connection. Since the filler connection cross section is diminished during the first welding procedure, the flowthrough opening of the filler connection is only quite small. Because of the small incorporated air volumes obtained according to this procedure, the filled receptacles are therefore quite suitable for use in infusion procedures.

With the execution of such process, problems arise in many instances. These problems imply that the final welding procedure does not lead to a complete hermetical seal without pores.

SUMMARY OF THE INVENTION

An object of the present invention is to provide an improved process for filling and sealing receptacles in which a complete sealing of the receptacle without pores is guaranteed.

The foregoing object is obtained by a process for filling and sealing an at least partially elastically deformable container of heat sealable material, comprising the steps of: forming an elastically deformable container with a filler connection having cross-sectional dimensions smaller than a body portion of the container and an open end at a distal end of the filler connection; filling the container through the open end thereof to a first level of contents; raising the contents to a higher, second level inside the filler connection of the container by elastically deforming the container; in a first heat sealing step, reforming the filler connection to reduce the transverse cross-sectional dimensions of the flow passage by pressing flat and heat sealing a border zone of the filler connection after filling, the passage remaining open at the distal end thereof; in a second heat sealing step, closing and sealing the distal end of the passage after raising the contents to the second level; and between starting to raise the contents to the second level and starting the second heat sealing step, removing vapors, clouds or foams from an upper surface of said contents in the filler connection by suction by applying reduced pressure in the filler connection.

This additional step leads to a partial or complete vacuum suction of vapors, clouds or foams which are formed above the liquid level of the contents. Whatever the physical properties of the liquid contents, the welding point is protected in front of the intake of or above the contents, so that a hermetical seal without pores (i.e., airtight) of the receptacle can be guaranteed.

The process according to the present invention can be carried out in a simple manner. For instance, the filler mandrel, traditionally used for feeding filler material or liquid contents into the receptacle and for discharging waste air during the filling procedure, has an waste air conduit which can be connected during the relevant length of time with an air suction line.

In many cases especially good results are obtained when the vacuum or suction pressure is established throughout the length of time starting from the beginning of the deformation of the receptacle (i.e., from the beginning of the raising of the liquid level) until shortly before the highest liquid level of the contents is reached.

In most cases, the first welding procedure is preferably carried out following termination of the application of the vacuum or suction pressure. In that case, the filler mandrel with its waste air conduit providing vacuum pressure is raised shortly before the highest liquid level in the receptacle is reached. With use of a device of the selected type, disclosed in German Utility Pat. No. 87 08 939.4, the first half of the jaw provided for the welding closes at that point. Shortly thereafter, when as a result of plastic shrinkage, the liquid level has reached its highest liquid gauge level, the second half of the jaw closes.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIGS. 1 and 2 are partial, diagrammatic and simplified side elevational views in cross-section of that area of a device for the execution of the process according to the present invention in which a filler mandrel cooperates with a mold assembly to form and fill a receptacle, and the device is shown in a first operational position and a second operational position, respectively; and FIGS. 3 and 4 are partial, diagrammatic and simplified side elevational views of the device of FIGS. 1 and 2, in which the device is shown in third and fourth operational configurations, respectively.

DETAILED DESCRIPTION OF THE INVENTION

A filler mandrel 1 moves vertically (in other words, in its lengthwise direction) as shown in FIG. 1, illustrating only the front end segment of the filler mandrel. The filler mandrel has an inner, centrally positioned conduit 3 for feeding liquid filler material or contents 5 into a receptacle 7. Inner conduit 3, located within filler mandrel 1, is surrounded by an air conduit 9. Air conduit 9 is constructed within filler mandrel 1 in the form of an annular passageway arranged concentrically to conduit 3. Air conduit 9 is connected at its widened top end section 11, through a flexible connector conduit 12, with a valve arrangement or system 13, as shown in FIGS. 1 and 2.

The pouch or receptacle 7 is produced from a plastic tube by the blow molding method. The tube is introduced into a mold assembly 15, which has movable mold members 16 and 17, as is conventional in blow molding devices. Additionally, movably positioned jaws 19 and 20 can be thrust into the top end of the mold assembly. The jaws each have a bottom or lower jaw member 21 and a top or upper jaw member 22. Top jaw members 22 are mounted so that they can be displaced separately in and of themselves relative to bottom jaw members 21.

Mold member 16 is provided with a cutout or recess 25, housing a displacement piston 27. Piston 27 can be displaced in cutout 25 between an inoperative position shown in FIG. 1, and an operational position shown in FIGS. 2 to 4. The work surface of piston 27 turned toward or facing the inside chamber of the mold of mold assembly 15 terminates flush with the inside surface of the mold assembly 16, when displacement piston 27 is located in its inoperative position. In the piston inoperative position, the piston working surface forms a part of the mold contact surface for production of receptacle 7.

Following the introduction of the plastic tube into mold assembly 15, mold members 16 and 17 are closed for producing a filled and closed receptacle 7. The valve arrangement 13 has an air blast valve 29 which is opened to supply blasts of air through conduit 12 and air conduit 9 within filler mandrel 1 in order to form receptacle 7 in the mold assembly by the blow molding method. Following closing of air blast valve 29, a valve 30 for discharge of waste air, which is also a part of the valve arrangement 13, is opened while the liquid filler material is supplied through conduit 3 of filler mandrel 1. The liquid material is supplied until liquid level 33 in receptacle 7 has reached the level indicated in FIG. 1. Discharge air valve 30 is then closed. A vacuum intake air or air suction valve 31, which is a part of the valve arrangement 13, is then opened. Vacuum intake valve 31 is connected with a vacuum pressure source. Thus, a vacuum or reduced pressure is produced through conduit 12 as well as inner air conduit 9, within filler mandrel 1, and inside receptacle 7. The vacuum or reduced pressure is established in the space above liquid level 33.

Liquid level 33 is raised by the volume displacement resulting from the movement of displacement piston 27 from its inoperative position, shown in FIG. 1, to its operational position, shown in FIGS. 2 and 4 (see FIG. 2). Shortly before liquid level 33 reaches its highest point, filler mandrel 1 is raised and air suction valve 31 forming the vacuum or suction pressure is closed. Jaws 19, 20 are then closed by movement of their bottom jaw members 21, whereupon the dimensions of the flowthrough opening at the top or discharge end of filler connection 35 of receptacle 7 are diminished in a first welding procedure. Liquid level 33 attains its maximum height as a result of plastic shrinkage (see FIG. 3). Shortly thereafter, the top jaw members 22 close, in a second welding procedure, closing and sealing by fusion welding the mouth opening 36 of filler connection 35 which still remains open after the first welding procedure (see FIG. 4).

With corresponding control of the movement and configuration of filler mandrel 1, the method could also be carried out so that filler mandrel 1 remains resting on mouth opening 36 while the first welding operation is carried out by closing bottom jaw members 21. In such a case, the vacuum pressure in the chamber of filler connection 35 could also be maintained during execution of the first welding operation, and up to the beginning of the second welding operation.

While various embodiments have been chosen to illustrate the invention, it will be understood by those skilled in the art that various changes and modifications can be made therein without departing from the scope of the invention as defined in the appended claims.

What is claimed is:

1. A process for filling and sealing an at least partially elastically deformable container of heat sealable material, comprising the steps of:
   forming an elastically deformable container with a filler connection having a flow passage with cross-sectional dimensions smaller than a body portion of the container and an open end at a distal end of the filler connection;
   filling the container through the open end thereof to a first level of contents;
   raising the contents to a higher, second level inside the filler connection of the container by elastically deforming the container;
   in a first heat sealing step, reforming the filler connection to reduce the transverse cross-sectional dimensions of the flow passage by pressing flat and heat sealing a border zone of the filler connection after filling, the passage remaining open at the distal end thereof;
   in a second heat sealing step, closing and sealing the distal end of the passage after raising the contents to the second level; and
   between starting to raise the contents to the second level and starting the second heat sealing step, removing vapors, clouds or foams from an upper surface of said contents in the filler connection by suction by applying reduced pressure in the filler connection.

2. A process according to claim 1 wherein the reduced pressure is applied during at least a portion of time while the contents are raised from the first level to the second level.

3. A process according to claim 1 wherein the reduced pressure is applied from initiation of elastically deforming the container until shortly before the contents reach the second level.

4. A process according to claim 3 wherein said first heat sealing step is carried out following termination of applying the reduced pressure.

5. A process according to claim 1 wherein said first heat sealing step is carried out before termination of applying the reduced pressure.

* * * * *